United States Patent
Wassermann et al.

(12)

(10) Patent No.: US 12,510,153 B2
(45) Date of Patent: Dec. 30, 2025

(54) LOCKING UNIT WITH PILOT VALVE

(71) Applicant: SVM Schultz Verwaltungs-GmbH & Co. KG, Memmingen (DE)

(72) Inventors: Ralph Wassermann, Holzgünz (DE); Florian Hölzle, Illertissen (DE)

(*) Notice: Subject to any disclaimer, the term of this patent is extended or adjusted under 35 U.S.C. 154(b) by 0 days.

(21) Appl. No.: 18/635,457

(22) Filed: Apr. 15, 2024

(65) Prior Publication Data

US 2024/0353004 A1    Oct. 24, 2024

(30) Foreign Application Priority Data

Apr. 21, 2023 (DE) .......................... 102023110230.3

(51) Int. Cl.
   F16H 63/34    (2006.01)
   F15B 15/26    (2006.01)

(52) U.S. Cl.
   CPC ....... F16H 63/3483 (2013.01); F15B 15/261 (2013.01); F16H 63/3475 (2013.01)

(58) Field of Classification Search
   CPC .. F16H 63/34; F16H 63/3416; F16H 63/3433; F16H 63/3475; F16H 63/3483; B60T 1/005; F16B 15/26; F16B 15/261
   See application file for complete search history.

(56) References Cited

U.S. PATENT DOCUMENTS

| 11,731,593 | B2 | 8/2023 | Hölzle et al. | |
| 2004/0011609 | A1* | 1/2004 | Schmid | F16H 63/3433 |
| | | | | 188/158 |
| 2013/0228412 | A1* | 9/2013 | Scherer | F15B 15/261 |
| | | | | 192/219.4 |
| 2020/0191267 | A1* | 6/2020 | Mang | F16H 63/3483 |
| 2021/0381594 | A1 | 12/2021 | Wassermann et al. | |

FOREIGN PATENT DOCUMENTS

| DE | 102020107057 A1 | 9/2021 | |
| DE | 102020115045 A1 | 12/2021 | |
| WO | WO-2024231045 A1 * | 11/2024 | ............ B60T 1/005 |

OTHER PUBLICATIONS

Foreign communication from the German Patent Office, Office Action dated Dec. 14, 2023, 6 pages.

* cited by examiner

*Primary Examiner* — Richard M Lorence
(74) *Attorney, Agent, or Firm* — Keith C. Rawlins, Esq.; Scheef & Stone, L.L.P.

(57) ABSTRACT

A locking unit can include: a housing having a fluid inlet and a fluid outlet which are connectable to a coolant circuit, and a pilot pressure chamber; a fluid duct which fluidically connects the fluid inlet to the pilot pressure chamber; a solenoid; a piston; a pilot valve, wherein an armature and/or an armature rod of the solenoid adjusts the pilot valve between a pilot valve open position which releases the fluid duct and a pilot valve closed position which closes the fluid duct; and a main valve, wherein a fluid pressure in the pilot pressure chamber adjusts the main valve between a main valve open position which releases the fluid outlet and a main valve closed position which closes the fluid outlet. The locking unit can lock the movement of the piston impingeable with pressure of fluid of the coolant circuit.

18 Claims, 3 Drawing Sheets

LOCKING UNIT WITH PILOT VALVE

CROSS-REFERENCE TO RELATED APPLICATION

This application claims the benefit of and priority to German Patent Application No. 10 2023 110 230.3, filed on Apr. 21, 2023, entitled "Locking unit with pilot valve", which is incorporated by reference herein in its entirety.

FIELD OF THE DISCLOSURE

The present disclosure generally relates to electric vehicles, and more particularly, to a locking unit for an automatic transmission in electric vehicles.

BACKGROUND

Locking units are used, for example, in automatic transmissions of motor vehicles, in particular in electric drive trains, which can be locked in a parked state. Locking units of this type can be embodied in such a manner that the parking lock is locked or unlocked in different states, depending on the shift position. A piston, which can be moved hydraulically and locked electromechanically, can be used for this purpose, for example.

In some cases, the hydraulic pressure delivered by a system, such as a coolant circuit of an E-axle, is insufficient to satisfactorily adjust a piston of a locking unit for the automatic transmission.

SUMMARY

A locking unit can include: a housing having a fluid inlet and a fluid outlet which are connectable to a coolant circuit, and a pilot pressure chamber; a fluid duct which fluidically connects the fluid inlet to the pilot pressure chamber; a solenoid; a piston; a pilot valve, wherein an armature and/or an armature rod of the solenoid adjusts the pilot valve between a pilot valve open position which releases the fluid duct and a pilot valve closed position which closes the fluid duct; and a main valve, wherein a fluid pressure in the pilot pressure chamber adjusts the main valve between a main valve open position which releases the fluid outlet and a main valve closed position which closes the fluid outlet.

BRIEF DESCRIPTION OF THE DRAWINGS

Further features, details, and advantages of the invention are derived from the wording of the claims and from the description for the drawings, in which:

DETAILED DESCRIPTION

The disclosed locking unit can lock the movement of the piston impingeable with the pressure of fluid of a coolant circuit. The electromagnetic operation of the pilot valve for the pilot control of the main valve closes the fluid outlet, and thus increases the fluid pressure and adjusts the piston. Therefore, the issue of insufficient hydraulic pressure for adjusting the piston is addressed, in that, the main valve closes or blocks the fluid outlet. This blocking makes it possible for a hydraulic pressure to continue to be conveyed counter to the blocking and into the locking unit. A pressure increase that can act on the piston in order to adjust the latter can be established. Specifically, the fluid prevalent at the fluid inlet of the parking lock can be used to adjust the main valve to its main valve closed position. Ultimately, a hydraulic pressure prevalent at the fluid inlet of the parking lock can be increased many times over in such a way that this increased pressure adjusts the piston. As a result, achieving a high actuation pressure for the piston despite the usual low pressure level in a coolant circuit is achieved by a blocking action.

Therefore, a coolant circuit which may be present in vehicles, for example in an electric vehicle or the E-axle of the electric vehicle, can be used for adjusting the piston, for example. The fluid of the coolant circuit can serve for cooling and additionally for hydraulically operating the piston. In this way, the hydraulic fluid can readily be diverted for another purpose, notwithstanding the fact that it may have a pressure which per se is insufficient for adjusting the piston. Due to the fact that the locking unit per se can generate an increase in pressure for adjusting the piston, additional devices for increasing pressure, for example pumps or pump sizes provided for this purpose, are not needed.

Fluid can flow into the housing by way of the fluid inlet. Fluid can flow out of the housing by way of the fluid outlet. The fluid duct selectively connects the fluid inlet to the pilot pressure chamber, whereby the pilot valve is the only element closing the fluid duct. This embodiment reduces the number of components. Because the pilot valve is adjustable by the armature and/or the armature rod, opening or closing the fluid duct is linked to the activation of the solenoid. In the main valve closed position, the fluid outlet is closed but the fluid inlet is open. This guarantees that fluid can flow into the locking unit in order to fill the pilot pressure chamber and to adjust the piston. Fluid duct and fluid path may be used synonymously.

In aspects, the main valve is fluidically adjustable so that a separate drive for this purpose, for example a dedicated solenoid, can be dispensed with. The main valve can comprise a main valve slide part which can be disposed so as to be adjustable in a main valve chamber. It is moreover advantageous that this main valve is able to be pilot-controlled by the pilot valve. An advantage is that a solenoid with a relatively low rating can be used. Specifically, if the main valve were to be adjusted directly by the solenoid, a solenoid with a comparatively higher rating would have to be chosen by virtue of the forces of pressure and current. However, since the solenoid operates the pilot valve, the main valve can be pilot-controlled hydraulically. The pilot valve can comprise a pilot valve slide part. It is conceivable that the locking unit is configured in such a manner that the pilot valve is in the pilot valve closed position when the solenoid is non-energized, and is adjustable to the pilot valve open position when the magnet is energized. Said pilot valve can remain in the latter position until the solenoid is de-energized again, so that the pilot valve is adjusted to its pilot valve closed position.

The locking unit can operate as follows. A hydraulic pressure, for example from a coolant circuit, can be prevalent at the fluid inlet. The main valve is in its main valve open position, and the fluid can flow into the housing by way of the fluid inlet, and flow out of the housing by way of the fluid outlet. The locking unit can form part of the coolant circuit. In this mode of operation, the volumetric flow of coolant can flow—almost without impediment—on a short path through the locking unit, this leading to high flow cross sections and small pressure losses. The pilot valve is in its pilot valve closed position and closes the fluid duct. An inflow of fluid into the pilot pressure chamber is impossible. The pressure prevalent at the fluid inlet cannot adjust the piston, or cannot do so sufficiently quickly. In order for the piston to be adjusted, the solenoid now moves its armature and/or its armature rod, and thus also the pilot valve, from the pilot valve closed position to the pilot valve open position. The fluid duct is opened as a result. Fluid from the fluid inlet can now flow through the fluid duct into the pilot pressure chamber, as a result of which a fluid pressure which adjusts the main valve from its main valve open position to its main valve closed position acts on the main valve. The latter in this main valve closed position closes the fluid outlet. Fluid continues to be able to be conveyed, counter to the blocking of the fluid outlet, into the locking unit by way of the fluid inlet, this leading to an increase in pressure in the locking unit that subsequently adjusts the piston. When the main valve, controlled by the pressure, is then adjusted back to its main valve open position, the fluid outlet is also open again and the pressure level in the locking unit drops again.

The housing can be penetrated by a longitudinal axis. The armature, the armature rod and/or the piston are/is adjustable along the longitudinal axis.

The piston can be adjustable, in particular between a retracted retraction position and a deployed deployment position. The piston can have a pressure surface which delimits a piston pressure chamber which is able to be filled with fluid. The piston pressure chamber can be fluidically connected to the fluid inlet and/or the fluid outlet. The pressure increase for adjusting the piston can act on the latter in the piston pressure chamber.

The locking unit can have at least one latching element, for example a ball, and the piston can have at least a first latching receptacle and a second latching receptacle. The piston can be fixed by the retaining interaction between the at least one latching element and one of the latching receptacles. An adjustment of the piston can be blocked in a simple manner as a result.

It is conceivable that the locking unit has a control element which is fixedly connected to the armature and/or the armature rod of the solenoid. The control element is subsequently adjustable between a blocking position and a releasing position by the adjustment of the armature or of the armature rod and—depending on the position—can push the at least one latching element radially outwards. The control element serves in particular to push the at least one latching element radially outwards into a latching receptacle of the piston or indeed not radially outwards—depending on the position of said control element. As a result, locking of the piston is achieved with the control element in a corresponding position. Because the pilot valve as well as the control element can now be connected to the armature and/or the armature rod as a result, both can be operated by the one solenoid.

In some aspects, the main valve can comprise a pressure surface A which delimits the pilot pressure chamber. The pressure surface A can be formed by the main valve slide part. As a result, the pressure in the pilot pressure chamber can act directly on the main valve or the main valve slide part of the latter.

In some aspects, the pilot pressure chamber can be delimited by the pressure surface A of the main valve, by the housing and by a housing plug. The housing plug serves for easy assembling of the locking unit in such a way that components, for example a main valve slide part and/or a preloading element or a main valve spring, can be introduced into the housing during assembly, and the housing can thereafter be closed in relation to the environment. The housing plug serves for establishing tightness of the pilot pressure chamber in such a way that said housing plug is fixedly connectable/connected to the housing, preferably after components have been introduced into the housing. The housing plug is preferably connected to the housing in a pressure-tight manner. The housing plug is preferably configured to be pressure tight so as not to generate any unnecessary pressure losses.

In some aspects, the main valve can comprise a pressure surface B. The latter can be exposed to the fluid inlet and/or the fluid outlet. The pressure surface B can be formed by the main valve slide part.

In some aspects, the main valve chamber can be configured in the housing. It is conceivable that the main valve chamber is fluidically connected, preferably directly, to the fluid inlet and/or the fluid outlet. As a result, the main valve can be disposed physically close to the fluid inlet and/or the fluid outlet, so as to achieve a pressure increase as fast as possible.

In some aspects, the main valve can be preloaded to the main valve open position by a preloading element, for example by a main valve spring. This preloading leads to the main valve being of the normally open type, and a flow through the locking unit is made possible. The preloading element can be a helical compression spring which at one end is supported on the main valve or the main valve slide part of the latter. At the other end, the preloading element can be supported on the housing. Functional preloading, which is reliable in terms of operation, is possible as a result. The spring force of the preloading element can act counter to the fluid pressure from the pilot pressure chamber. As soon as the fluid pressure in the pilot pressure chamber exceeds the spring force, the latter can push the main valve-counter to the spring force—to its main valve closed position. As soon as the fluid pressure in the pilot pressure chamber drops below the spring force, the preloading element can push the main valve to its main valve open position.

In some aspects, the preloading element can be disposed outside the fluid duct. This results in lower associated pressure losses because the preloading element does not interfere with the flow of an operating output of a pump. Moreover, a risk of dirt accumulating on the preloading element is avoided, which may be caused sporadically by dirt being released into the fluid duct due to the deformation of the preloading element, and may cause malfunctions.

In some aspects, the preloading element can be a main valve spring of a helical compression spring type. As a result, the latter does not have to be fixedly connected to components on which it is supported.

In some aspects, the housing can comprise a main valve guide sleeve. The guide sleeve can be made of metal. The guide sleeve can be fixedly connected to the housing, preferably be insert-molded with the latter. This serves the purpose of economical ease of production and ensures a durable tight fit of the sleeve about the housing. The main valve slide part can be disposed in and guided by the main valve guide sleeve. Such a main valve guide sleeve serves the purpose of reliable sealing in relation to the main valve slide part in the event that the housing per se cannot establish sufficient tightness in relation to the main valve slide part, for example due to unachievable tolerances. This applies in particular in the event that the housing is made of plastics material and the main valve guide sleeve is made of metal.

In some aspects, the pilot valve can comprise a pilot valve slide part which is preloaded to the pilot valve closed position by a preloading element and/or rests against a control element which is fixedly connected to the armature or the armature rod. The pilot valve slide part can be mounted so as to be displaceable on the armature and/or the armature rod and/or the yoke part. As a result, a fixed connection to the armature and/or the armature rod can be dispensed with in order to reduce production and assembly costs, and to preclude any transmission of undesirable forces. The pilot valve slide part can be penetrated in the longitudinal direction by the armature and/or the armature rod, so as to enable simple assembling. Moreover, such a pilot valve slide part is particularly suitable in conjunction with a cylindrical pilot valve chamber. The pilot valve slide part can be guided in the pilot valve chamber. Moreover, a disadvantageous introduction of force can be prevented by the displaceable mounting. Forces which can be introduced from outside the locking unit by way of the piston, predominantly transversely to the longitudinal direction, and forces which emanate from an electromagnetic transverse pull of the armature, can no longer be transmitted to the pilot valve slide part. Friction on the pilot valve slide part is consequently prevented, this reducing the required activation forces for the pilot valve slide part and precluding, or at least minimizing, any disadvantageous hysteresis.

In some aspects, the pilot valve slide part can comprise a closure portion and a fluidic portion on the circumference. The closure portion can be larger than the fluidic portion in terms of the external diameter. The fluidic portion can be designed as a circumferential protrusion or recess in relation to the closure portion. In this way, the closure portion can seal on the external circumference and close off the fluid duct, and the fluidic portion can serve to create a flow about the pilot valve slide part and guide the fluid duct. Recesses for routing fluid in the housing, which are complex to produce, can be dispensed with by such a fluidic portion. The closure portion, which is larger in terms of diameter, can have a shoulder which can form a control edge. This control edge, when interacting with a duct opening disposed on the external circumference in terms of the pilot valve slide part, can open or close the fluid duct. The closure portion and/or the fluidic portion can be formed by the pilot valve slide part, which is why only a single component is advantageously required here. The closure portion can support annular seals and/or seal the pilot valve chamber and/or a pilot valve circumferential space, preferably so as to rest against the yoke part.

In some aspects, the fluidic portion can delimit a pilot valve circumferential space through which the fluid duct is routed. Advantageously, the pilot valve circumferential space is delimited on the internal circumference by the pilot valve slide part, and on the external circumference by a yoke part of the solenoid, in particular by a hollow-cylindrical portion of the yoke part. This enables a compact construction mode. The pilot valve circumferential space can be disposed in the pilot valve chamber and/or be a portion of the pilot valve chamber. The pilot valve circumferential space can moreover be delimited by the closure portion and/or the sealing portion.

In some aspects, the pilot valve circumferential space can be delimited in the longitudinal direction by faces of identical size on both sides. Because the fluid duct leads into the pilot valve circumferential space, preferably also in the pilot valve closed position, faces of identical size serve to provide a pressure equilibrium in the pilot valve circumferential space. As a result, it can be prevented that the pilot valve slide part is adjusted by the prevalent fluid pressure when the pilot valve circumferential space is fluidically connected to the fluid inlet, for example via the fluid duct, as a result of which the fluid duct could be unintentionally opened. Operational reliability is increased as a result. These faces of identical size can be formed by the closure portion and/or the sealing portion.

In some aspects, the pilot valve slide part can comprise a sealing portion which can be disposed on the side of the fluid portion that lies opposite the closure portion. The sealing portion can support annular seals and/or seal the pilot valve chamber and/or the pilot valve circumferential space, preferably by resting on the yoke part.

In some aspects, the solenoid can form the pilot valve chamber in which the pilot valve slide part can be guided. As a result, an integration of the pilot valve slide part into the solenoid is performed, and a compact construction mode is achieved. The pilot valve chamber is advantageously penetrated by the armature or the armature rod. A compact construction mode is also made possible as a result. Moreover, a component, for example the control element, on the side of the pilot valve slide part that lies opposite the solenoid is subsequently connectable to the armature rod.

In some aspects, for coupling the movement of the armature and/or the armature rod and the pilot valve, a pilot valve slide part can be supported in the longitudinal direction on the armature and/or the armature rod, or a component which is co-adjustable with the armature and/or the armature rod, preferably against the control element. The pilot valve slide part can be preloaded to this supporting action by a preloading element or a pilot valve spring. A compact construction mode having an advantageous force coupling between the solenoid and the pilot valve is implemented as a result. At the other end, the preloading element can be supported on the yoke part. The pilot valve slide part mentioned can be the pilot valve slide part mentioned above.

In some aspects, the solenoid can comprise a yoke part which can delimit a pilot valve chamber. The yoke part can be the yoke part mentioned above and/or delimit the pilot valve circumferential space. The pilot valve chamber can be the pilot valve chamber mentioned above. The yoke part can have a hollow-cylindrical portion. The pilot valve slide part can be disposed in the hollow-cylindrical portion, preferably being guided by the hollow-cylindrical portion, whereby the displaceable mounting can be configured here. A compact construction mode is also enabled as a result.

However, the hollow-cylindrical portion is also advantageous because the latter can externally circumferentially guide the fluid duct. This assignment of function to the yoke part reduces the number of components, reduces the complexity in terms of construction, and reduces the installation space required.

It is moreover conceivable that latching element bores are formed in the hollow-cylindrical portion. The latching element bores can be oriented in the radial direction, and serve to receive the latching elements. Each latching element bore can be assigned one latching element. Depending on the position, the control element can push the latching elements outwards in the radial direction and through the latching element bores into the corresponding latching receptacle of the piston. A compact construction mode is also enabled as a result.

Moreover, it is conceivable that the pilot valve slide part is preloaded by a spring, for example by a preloading element or a pilot valve spring, whereby a certain installation space in the longitudinal direction is required for this in order to receive the preloading element or the pilot valve spring. By virtue of the functional integration mentioned, the yoke part can therefore advantageously combine various different functions in a single component so as thereby to enable a compact construction mode.

In some aspects, the latter can comprise at least one duct opening to the pilot valve chamber and/or the pilot valve circumferential space, wherein the fluid duct can lead through the duct opening, wherein the duct opening is able to be selectively closed or released by the sealing portion. Two or a plurality of duct openings to the pilot valve chamber and/or the pilot valve circumferential space, which guide the fluid duct, can also be provided. A duct opening can be the duct opening mentioned above and/or be disposed circumferentially in relation to the pilot valve slide part in the yoke part, or the hollow-cylindrical portion of the latter. The fluid duct can subsequently lead through the pilot valve chamber and/or through the pilot valve circumferential space in a simple manner. This embodiment is also advantageous from another point of view, i.e. in the event that the control element is fastened to the armature or the armature rod, so that the solenoid operates the pilot valve slide part and the control element. At the same time, the yoke part is a component which, owing to the latching element bores, is to be produced by precise production methods—which may also be required for a valve sleeve anyway. In terms of production, in this way a plurality of precise functions are integrated into a single component, specifically the yoke part, as a result of which advantages in terms of cost reduction are derived.

In some aspects, the solenoid and/or the pressure surface A are/is sized in such a manner that a fluidic force which can act on the pressure surface A is greater than an actuating force of the solenoid. As a result, the main valve, or the main valve slide part by way of its pressure surface A, is adaptable in such a way that said main valve or said main valve slide part is able to be operated by the pressure level of a coolant pump of the coolant circuit. This also leads to the actuating force, by the fluid pressure present in the pilot pressure chamber, being greater than any mechanical adjustment of the main valve or of the main valve slide part per solenoid, the latter not being able to be provided for this purpose from the outset.

In some aspects, the housing can be configured in one piece and in a materially integral manner and comprise two cavities which can be separated by a housing partition wall, wherein the fluid duct can lead through the housing partition wall. This embodiment lowers production and assembly costs but at the same time does not restrict the functionality. Each of the two cavities, on one of its two longitudinal sides, can have an opening which is closed in relation to the environment. In this way, the housing having the two cavity longitudinal openings is able to be produced from one piece, for example, and able to be equipped in the longitudinal direction during assembly of the locking unit. Thereafter, these cavity longitudinal openings can be closed in relation to the environment at least on one side, for example by a housing plug or by a solenoid. It is therefore conceivable that the main valve is disposed in one of the cavities, and the pilot valve is disposed in the respective other of the cavities.

In some aspects, a drain duct can be fluidically connected to the pilot pressure chamber. This is advantageous in the event that a return flow of fluid from the pilot pressure chamber via the fluid duct is no longer possible by virtue of a pilot valve being in the pilot valve closed position, for example. The pilot pressure chamber can be rapidly emptied by the drain duct, so as to implement a rapid adjustment of the main valve from its main valve closed position to its main valve open position. It is conceivable that the drain duct is fundamentally open, whereby the latter in this instance can be sized in such a way that filling of the pilot pressure chamber for adjusting the main valve can take place despite the drainage through the drain duct. It is conceivable that the drain duct is not the fluid duct. The drain duct is also advantageous in that any unintended build-up of pressure in the pilot pressure chamber and any unintended adjustment of the main valve or the main valve slide part can thereby be prevented in the event of a potential leakage at the pilot valve or the pilot valve slide part and an insufficiently closed fluid duct.

In some aspects, the pilot valve slide part can be made from thermoplastics, and the yoke part or the hollow-cylindrical portion thereof can be made of metal, preferably steel. This material pairing enables a large amount of play in the slide, and associated therewith economical production, because the play in the slide can lead to a leakage and thus losses, depending on the viscosity of the fluid. Moreover, this material pairing prevents a leakage as a result of the difference in terms of coefficients of thermal expansion, because the pilot valve slide part of thermoplastics expands to a greater extent than the yoke part, of the hollow-cylindrical portion thereof, of steel. As the temperature increases, the pilot valve slide part has a compensating effect in terms of the effect of the viscosity which likewise drops as the temperature increases.

In some aspects, the preloading element or the pilot valve spring can be configured and/or disposed so as to adjust the pilot valve to its pilot valve closed position and, simultaneously, to adjust a control element to its blocking position. Subsequently, the one preloading element/the one pilot valve spring can preload two elements to a respective dedicated position.

In some aspects, the fluid duct can have only a single flow direction. In this instance, this flow direction is from the fluid inlet to the pilot pressure chamber. A return flow through the fluid duct is not provided in this instance. This embodiment leads to a significant simplification of the construction because the fluid duct can thus be closed by the pilot valve, irrespective of the filling level of the pilot pressure chamber. A drain duct can be provided for emptying the pilot pressure chamber, for example.

In some aspects, the main valve slide part can have a pot-shaped pressure portion, a rod-shaped connection portion and/or a pot-shaped support portion, preferably so as to be mutually adjacent in the longitudinal direction. The pot-shaped pressure portion can be formed on one end of the main valve slide part, open to the pilot pressure chamber and/or be larger than the connection portion in terms of diameter. The pressure portion can form the pressure surface A and/or the pressure surface B, whereby this is advantageous because a large surface is exposed to the fluid pressure in the pilot valve chamber in this way. The pressure portion can guide the main valve slide part and/or support annular seals which seal the pilot pressure chamber. The main valve slide part can on one end have a spacer pin which in the longitudinal direction extends beyond the pot-shaped pressure portion. As a result, the spacer pin serves as an impact element, whereby the difference of the extent in the longitudinal direction of the pressure portion and the spacer pin enables a radial inflow into the pilot pressure chamber via the fluid duct and/or an outflow via the drain duct. In the main valve open position, the spacer pin can come to bear, and in this way delimit the actuation travel. The rod-shaped connection portion enables a circumferential flow about the main valve slide part in each position of the main valve. The pot-shaped connection portion can be disposed on the other end of the main valve slide part, and open to the preloading element or the main valve spring. This provides reliable support and radial guidance for the preloading element. The support portion can guide the main valve slide part and/or support annular seals.

In the figures, like or corresponding elements are each denoted by like reference signs and therefore, if not expedient, are not described anew. To avoid repetition, features that have already been described are not described anew and, unless explicitly stated otherwise, are applicable to all elements having the same or corresponding reference signs. What is disclosed throughout the description can be transferred analogously to like components with like reference signs or like component descriptions. It is also the case that the positional information selected in the description, e.g. above/top, below/bottom, lateral, etc., relates to the figure directly described and illustrated and, in the case of a position being changed, can be transferred analogously to the new position. Furthermore, it is also possible for individual features or combinations of features from the different exemplary embodiments shown and described to constitute independent or inventive solutions or solutions.

Figure 1:
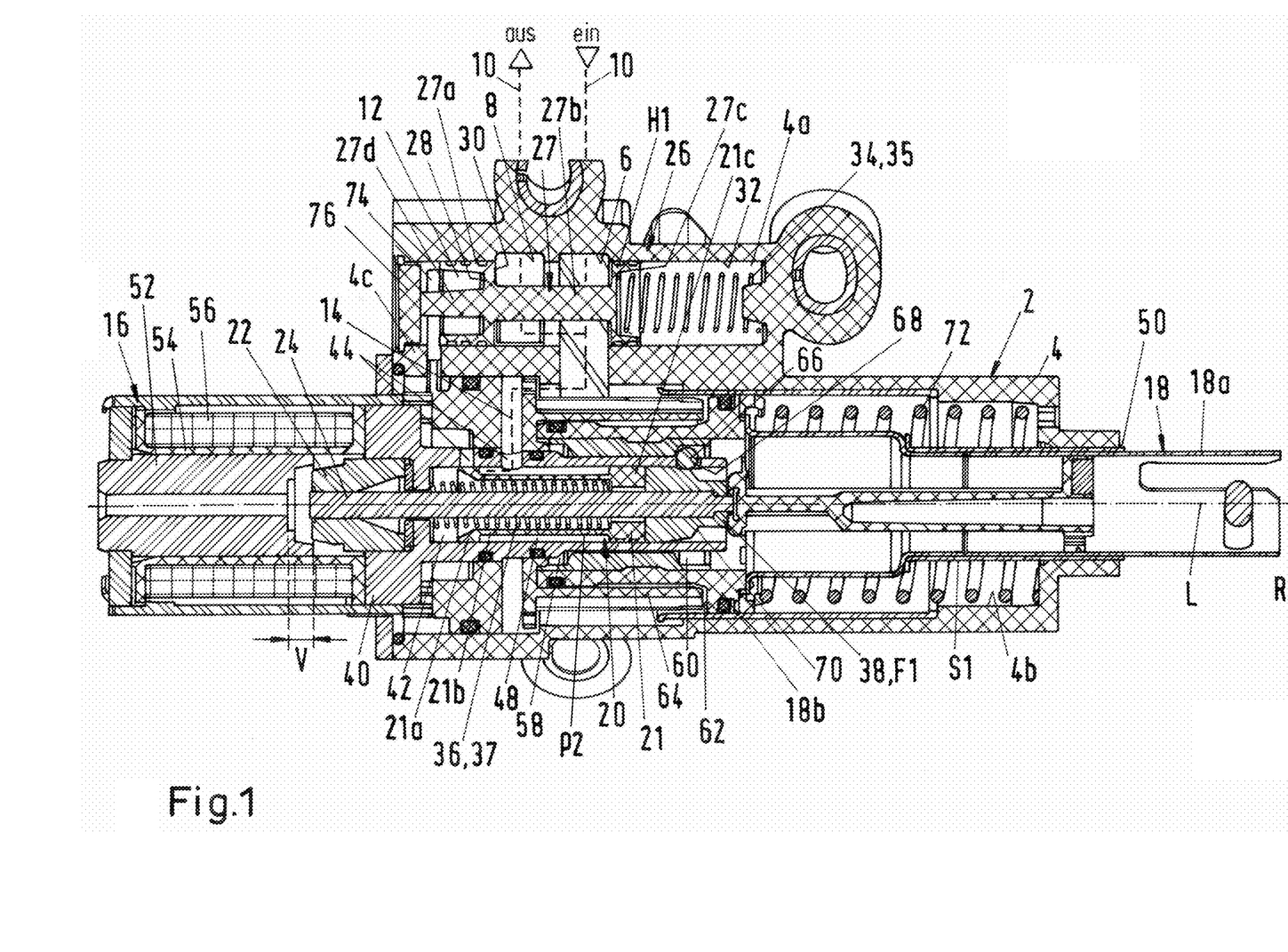
FIG. 1 shows a longitudinal sectional view through a locking unit in a first state.
Figure 2:
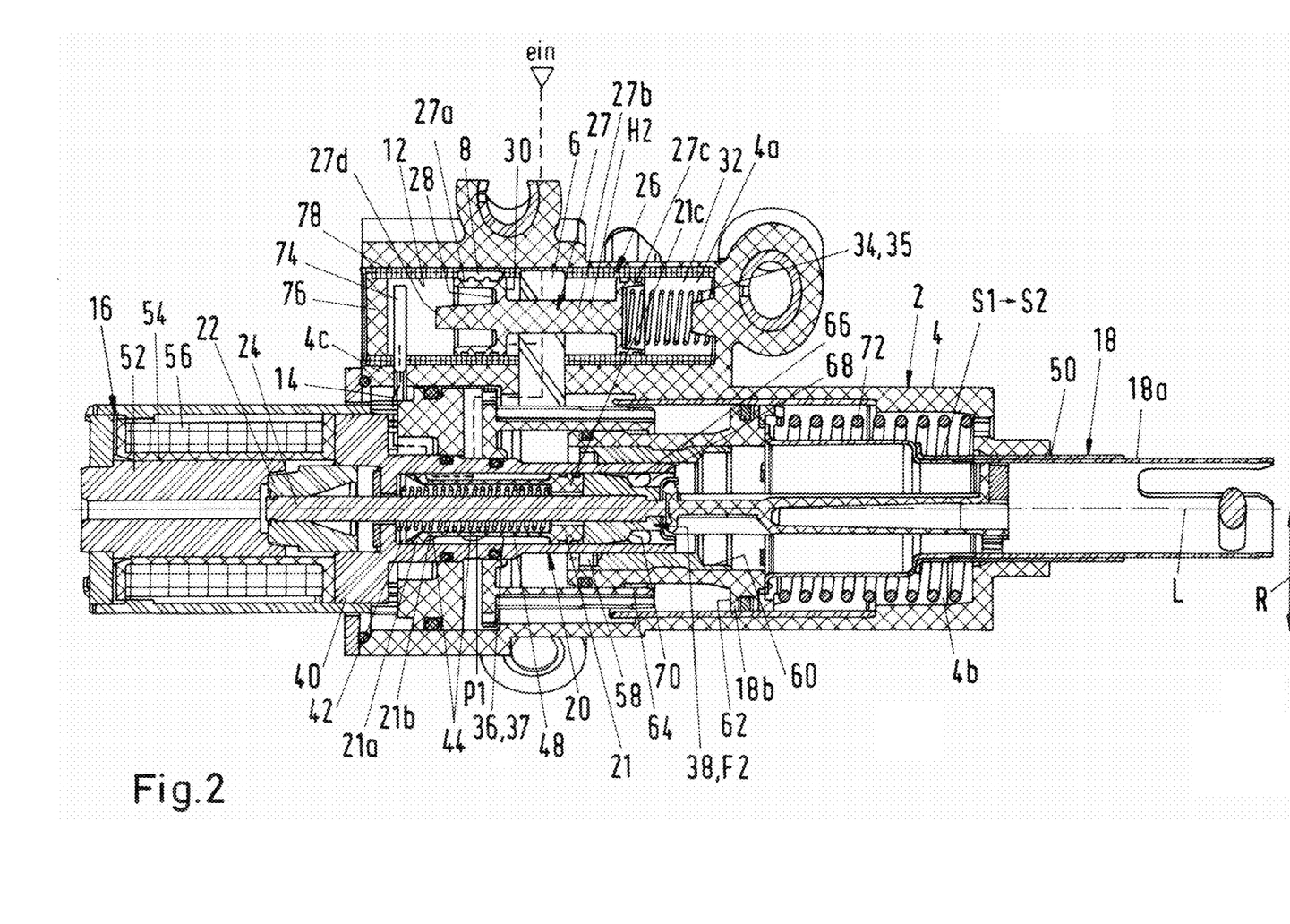
FIG. 2 shows a longitudinal sectional view through the locking unit of FIG. 1 in a second state.
Figure 3:
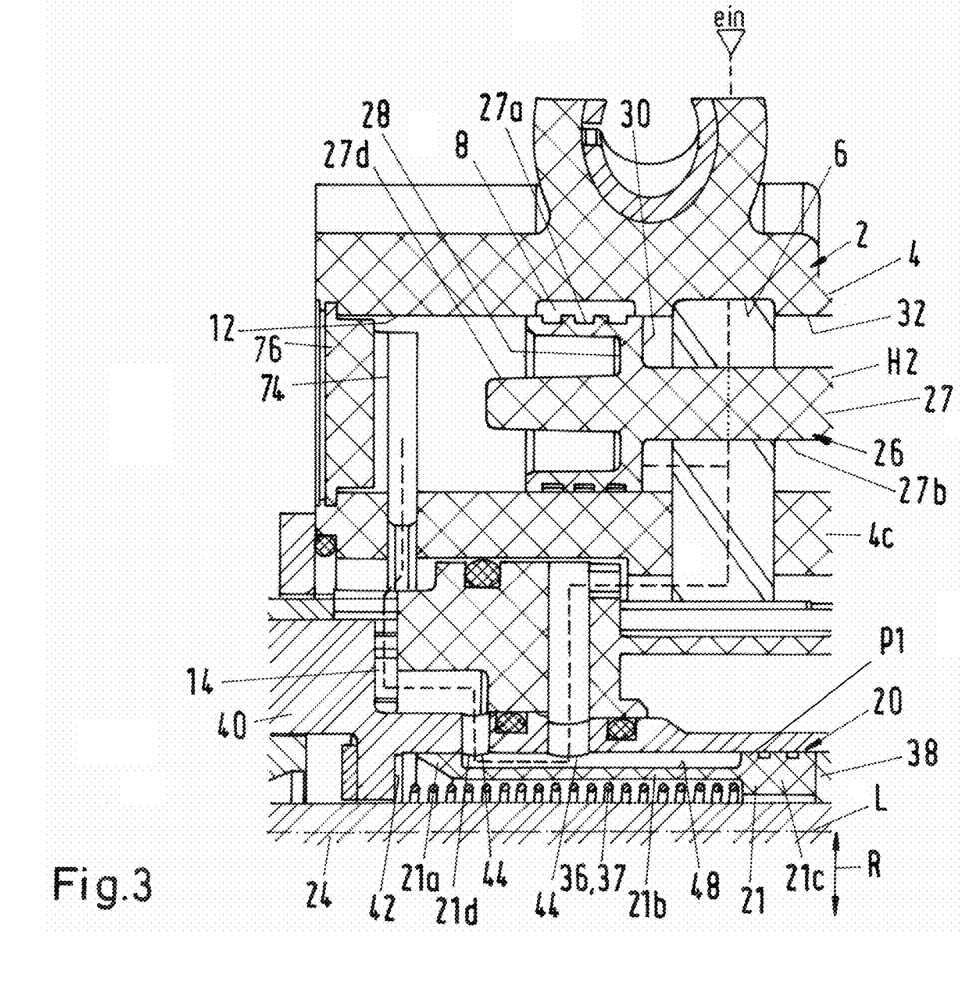
FIG. 3 shows an enlarged detailed view of the locking unit.

Shown in FIGS. 1 to 3 is a locking unit 2 in two different states. The sections shown in FIGS. 1 and 2 slightly deviate from one another. The locking unit 2 comprises a housing 4 which is penetrated by a longitudinal axis L, a radial direction R protruding from the latter. A longitudinal direction runs along the longitudinal axis L. The housing 4 has on one end an opening 50, or housing opening, and is adjoined by a solenoid 16 at the other end.

The solenoid 16 is illustrated as non-energized in FIG. 1 and as energized in FIGS. 2 and 3, and comprises a core 52, a coil carrier 54, a coil 56 wound thereon, a yoke part 40, an armature 22 and an armature rod 24 which is fixedly connected to the latter. The armature 22 and the armature rod 24 are adjustable along the longitudinal axis L. The armature 22 in FIGS. 2 and 3 is attracted and therefore adjusted by the adjustment travel V along the longitudinal axis L in the direction of the core 52.

The locking unit 2 has a piston 18 which is adjustable along the longitudinal axis L, between a retracted retraction position S1 (shown in FIG. 1) and a deployed deployment position S2, whereby FIG. 2 shows the adjustment of the piston 18 (to the right in the image plane) to its deployment position S2 in which the piston compression spring 72 is compressed (S1→S2).

In the locking unit 2 shown, the piston 18 comprises a plurality of parts, specifically at least one piston tube 18a, which partially protrudes from the opening 50, and a piston pressure piece 18b connected to said piston tube 18a. The piston pressure piece 18b is guided on the external circumference. The piston pressure piece 18b on the inner radial side thereof has latching receptacles 58, 60 which are mutually spaced apart axially (in terms of the longitudinal axis L) and are configured as annular convexities. The latching receptacles 58, 60 are disposed as a step or inner shoulder on the internal face of the piston pressure piece 18b. The piston 18 moreover has a pressure surface 62 which is formed on the piston pressure piece 18b and delimits a piston pressure chamber 64 which can be filled with a fluid. The piston 18 can be moved from its retraction position S1 to its deployment position S2 by the pressure of the fluid in the piston pressure chamber 64. This fluid pressure displaces the piston 18 to the right in the image plane, thus further through the opening 50.

The locking unit 2 has a control element 38, latching elements 66 and latching element bores 68. The control element 38 is fixedly connected to the armature rod 24, and therefore adjustable along the longitudinal axis L. The control element 38 here is adjustable between a blocking position F1 (FIG. 1) and a releasing position F2 (FIGS. 2 and 3). The latching element bores 68 are configured to be stationary, here by way of example in the yoke part 40 or the hollow-cylindrical portion thereof, and are oriented in the radial direction R, and serve to receive the latching elements 66. Each latching element bore 68 is assigned a latching element 66. The latching elements 66 here are configured as balls. The control element 38 has a conical face 70 which, depending on the position F1, F2, pushes the latching elements 66 in the radial direction R outwards through the latching element bores 68 into the corresponding one of the latching receptacles 58, 60.

In FIGS. 2 and 3 however, the control element 38 has been moved to its releasing position F2, so that the latching elements 66 are not urged radially outwards by the conical face 70, and therefore do not engage in a blocking manner in any latching receptacle 58, 60, the piston 18 thus being adjustable along the longitudinal axis L. In contrast, the control element 38 in FIG. 1 has been moved to its blocking position F1, so that the latching elements 66 engage in a blocking manner in the latching receptacle 60, the piston 18 consequently being fixed in relation to adjustment along the longitudinal axis L as a result of the retaining interaction of the latching elements 66 and the respective latching receptacle 60. In this way, the piston 18 can be locked in each position S1, S2, because the latching elements 66 in the retraction position S1 can be pushed into the second latching receptacle 60, and the latching elements 66 in the deployment position S2 can be pushed into the first latching receptacle 58. A pilot valve slide part 21 of a pilot valve 20 is disposed on the circumference of the armature rod 24, said pilot valve slide part 21 resting against the control element 38 and being supported on the latter, whereby the control element 38 is connected to the armature rod 24 so as to be co-adjustable with the latter.

A preloading element 36, which can be configured as a pilot valve spring 37, is supported between the yoke part 40 and the pilot valve slide part 21. The preloading element 36 preloads the pilot valve slide part 21 to a pilot valve closed position P2, and simultaneously preloads the control element 38 to a terminal position which here is defined as the blocking position F1. By energizing the coil 56 and attracting the armature 22 and longitudinally adjusting the armature rod 24, the pilot valve slide part 21 can be moved from this pilot valve closed position P2 to a pilot valve open position P1 (FIGS. 2 and 3). By energizing the coil 56 and attracting the armature 22 and longitudinally adjusting the armature rod 24, the control element 38 can be moved from this blocking position F1 to the releasing position F2 (FIGS. 2 and 3). The spring force of the preloading element 36 and the tensile force of the solenoid 16 are mutually opposed.

A piston compression spring 72, which can be configured as a helical compression spring, is supported between the piston 18 and the housing 4. Said piston compression spring 72 pushes the piston 18 into its retraction position S1. The spring force of the piston compression spring 72 and the force of the pressure of the fluid in the piston pressure chamber 64 are mutually opposed.

The solenoid 16 in FIG. 1 is illustrated as non-energized. As a result, the preloading element 36 pushes the control element 38 to its blocking position F1. The piston 18 is not moved to its deployment position S2 by fluid pressure. The latching elements 66 are pushed into the latching receptacle 60 by the control element 38. Therefore, the retracted position S1 of the piston 18 is secured.

The housing 4 is configured in one piece and in a materially integral manner, and moreover comprises a first cavity 4*a* and a second cavity 4*b* which are mutually separated by a housing partition wall 4*c*. The housing 4 moreover comprises a fluid inlet 6 and a fluid outlet 8 which are connectable to a coolant circuit 10.

The locking unit 2 furthermore comprises a pilot pressure chamber 12, a main valve chamber 32 and a pilot valve chamber 42. A fluid duct 14, or a fluid path, extends between the fluid inlet 6 and the pilot pressure chamber 12, whereby the fluidic duct 14 extends through the pilot valve chamber 42. The pilot valve chamber 42 is formed by the yoke part 40, and thus by the solenoid 16, and is penetrated by the armature rod 24. The main valve chamber 32 and the piston pressure chamber 64 are fluidically connected to the fluid inlet 6 and/or the fluid outlet 8. Two duct openings 44 are provided in the yoke part 40, or in the hollow-cylindrical portion thereof, whereby the fluid duct 14 leads through the duct openings 44. The section in FIG. 1 is directly through the duct openings 44, whereas the section in FIG. 2 runs adjacent to the duct openings 44. This results in slightly different sectional views.

The locking unit 2 comprises the pilot valve 20 which has the pilot valve slide part 21. The pilot valve 20 is adjustable between the pilot valve open position P1 (FIGS. 2 and 3), which releases the fluid duct 14, and the pilot valve closed position P2 (FIG. 1), which closes the fluid duct 14, by the armature rod 24. The pilot valve slide part 21 is mounted on the yoke part 40 to be displaceable in the longitudinal direction in the pilot valve chamber 42. The pilot valve slide part 21 on the circumference comprises a closure portion 21*a*, a fluid portion 21*b* and a sealing portion 21*c* which are mutually adjacent in the longitudinal direction. The closure portion 21*a* in terms of the external diameter is larger than the fluid portion 21*b* and has a control edge 21*d*. This control edge 21*d*, when interacting with one of the duct openings 44, opens or closes the fluid duct 14. The closure portion 21*a* and the sealing portion 21*c* bear in a guiding manner on the yoke part 40, and seal a pilot valve circumferential space 48. The pilot valve circumferential space 48 is part of the pilot valve chamber 42. The fluid portion 21*b* is designed as a circumferential protrusion or recess in relation to the closure portion 21*a*, and by way of the yoke part 40, the closure portion 21*a* and the sealing portion 21*c* delimits the pilot valve circumferential space 48, the fluid duct 14 leading through the latter, this being shown in particular in FIG. 3. The pilot valve circumferential space 48 is delimited in the longitudinal direction by faces of identical size on both sides, which are formed on the closure portion 21*a* and the sealing portion 21*c*.

The locking unit 2 moreover comprises a main valve 26 which has a main valve slide part 27 and is pilot-controlled by the pilot valve 20. The main valve 26 is adjustable between a main valve open position H1 (FIG. 1), which releases the fluid outlet 8, and a main valve closed position H2 (FIGS. 2 and 3), which closes the fluid outlet 8. The fluid inlet 6 is nevertheless open in the main valve closed position H2. Fluid from the coolant circuit 10 can flow in ("in") through the fluid inlet 6, but an outflow ("out") through the fluid outlet 8 is prevented by the main valve slide part 27.

The main valve slide part 27 is mounted in the main valve chamber 32 to be displaceable in the longitudinal direction. The main valve 26 is preloaded to the main valve open position H1 by a preloading element 34 which is configured as a main valve spring 35.

The main valve slide part 27 on one end comprises a pot-shaped pressure portion 27*a* which faces the pilot pressure chamber 12. Adjoining the latter in the longitudinal direction is a rod-shaped connection portion 27*b*, which is smaller in terms of diameter and is adjoined by a pot-shaped support portion 27*c*, the external diameter of the latter corresponding to that of the pressure portion 27*a*. The pot-shaped pressure portion 27*a* opens to the pilot pressure chamber 12 and comprises a pressure surface A 28 which delimits the pilot pressure chamber 12. The pilot pressure chamber 12 is moreover delimited by the housing 4 and a housing plug 76. On its opposite side, the pot-shaped pressure portion 27*a* has a pressure surface B 30. The pressure portion 27*a* guides the main valve slide part 27 and supports annular seals which seal the pilot pressure chamber 12. The main valve slide part 27 moreover has a spacer pin 27*d* which in the longitudinal direction extends beyond the pot-shaped pressure portion 27*a* and in the main valve open position H1 shown bears on the housing plug 76. As a result, the spacer pin 27*d* serves as an impact element, whereby the difference of the extent in the longitudinal direction of the pressure portion 27*a* and the spacer pin 27*d* enables a radial inflow through the fluid duct 14 into the pilot pressure chamber 12. Moreover, a radial outflow from the pilot pressure chamber 12 via a drain duct 74 is enabled. The rod-shaped connection portion 27*b* enables a circumferential flow about the main valve slide part 27 in each position H1, H2 of the main valve 26. The pot-shaped support portion 27*c* is formed on the other end of the main valve slide part 27 and opens towards the preloading element 34. In this way, the preloading element 34 is supported on the support portion 27*c* and on the housing 4.

The locking unit 2 of FIG. 1 is fundamentally shown in FIG. 2, but the housing 4 thereof additionally comprises a main valve guide sleeve 78. The main valve guide sleeve 78 is fixedly connected to the housing 4. The main valve slide part 27 is disposed in the main valve guide sleeve to be guided by the latter. For this purpose, the main valve guide sleeve 27 forms a guide face for the main valve slide part 27.

FIG. 3 moreover shows clearly that the fluid duct 14 leads through the housing partition wall 4*c*.

The functional mode is to be briefly explained hereunder. A hydraulic pressure, for example from a coolant circuit 10, can prevail at the fluid inlet 6. The main valve 26 is in its main valve open position H1 (FIG. 1), and the fluid can flow into the housing 4 through the fluid inlet 6, and can flow out of the housing 4 through the fluid outlet 8. The locking unit 2 can form part of the coolant circuit. In this mode of operation, the volumetric flow of coolant can flow on a short path through the locking unit, this leading to high flow cross sections and small pressure losses. The pilot valve 20 is in its pilot valve closed position P2 and closes the fluid duct 14 in that the closure portion 21*a* of the pilot valve slide part 21 closes a duct opening 44. An inflow of fluid into the pilot pressure chamber 12 via the fluid duct 14 is impossible. The pressure prevalent at the fluid inlet 6 cannot adjust the piston 18, or cannot adjust the latter fast enough. The control element 38 is in its blocking position F1 and urges the latching elements 66 radially outwards into the latching receptacle 60. An adjustment of the piston 18 is prevented.

For the piston 18 to be adjusted, the solenoid 16 by virtue of being energized now pulls its armature 22 and/or its armature rod 24 in the direction of the core 52. As a result, the control element 38 is moved to its releasing position F2, as a result of which the latching elements 66 are displaced from the latching receptacle 60 radially inwards. An adjustment of the piston 18 is now made possible. Moreover, the pilot valve 20 is also adjusted from the pilot valve closed position P2 to the pilot valve open position P1 (FIGS. 2 and 3). The previously closed duct opening 44 is now released by the closure portion 21a of the pilot valve slide part 21. The fluid duct 14 is opened as a result. Fluid can now flow from the fluid inlet 6 through the fluid duct 14 into the pilot pressure chamber 12, as a result of which a fluid pressure acts on the main valve 26 that adjusts the latter from its main valve open position H1 to its main valve closed position H2. Said main valve 26 in this main valve closed position H2 closes the fluid outlet 8. Fluid continues to be able to be conveyed into the locking unit 2 through the fluid inlet 6, counter to the blocking of the fluid outlet 8, whereby this leads to an increase in pressure in the locking unit 2, in particular in the piston pressure chamber 64, that subsequently adjusts the piston 18 to its deployment position S2.

When the solenoid 16 is de-energized, the preloading element 36 pushes the pilot valve 20 back to its pilot valve closed position P2. Fluid can now no longer flow through the fluid duct 14 into the pilot pressure chamber 12, but can also no longer flow back through the fluid duct 14. The fluid present in the pilot pressure chamber 12 can leave the pilot pressure chamber 12 via the drain duct 74, whereby said fluid is also ejected by the preloading element 34 of the main valve 26 while the main valve 26 is being returned to its main valve open position H1.

The invention is not restricted to one of the above-described embodiments, but rather can be modified in a wide variety of ways. All the features and advantages which are apparent from the claims, the description, and the drawing, including structural details, spatial arrangements, and method steps, can be essential to the invention both per se and in a very wide variety of combinations.

All combinations of at least two of the features disclosed in the description, the claims and/or the figures fall within the scope of the invention.

To avoid repetitions, features which are disclosed in accordance with the apparatus are also considered to be disclosed and capable of being claimed in accordance with the method. Features which are disclosed in accordance with the method are likewise considered to be disclosed and capable of being claimed in accordance with the apparatus Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

LIST OF REFERENCE SIGNS

2 Locking unit
4 Housing
4a Cavity
4b Cavity
4c Housing partition wall
6 Fluid inlet
8 Fluid outlet
10 Coolant circuit
12 Pilot pressure chamber
14 Fluid duct
16 Solenoid
18 Piston
18a Piston tube
18b Piston pressure piece
20 Pilot valve
21 Pilot valve slide part
21a Closure portion
21b Fluidic portion
21c Sealing portion
21d Control edge
22 Armature
24 Armature rod
26 Main valve
27 Main valve slide part
27a Pressure portion
27b Connection portion
27c Support portion
27d Spacer pin
28 Pressure surface A
30 Pressure surface B
32 Main valve chamber
34 Preloading element
35 Main valve spring
36 Preloading element
37 Pilot valve spring
38 Control element
40 Yoke part
42 Pilot valve chamber
44 Duct opening
48 Pilot valve circumferential space
50 Opening
52 Core
54 Coil carrier
56 Coil
58 Latching receptacle
60 Latching receptacle
62 Pressure surface
64 Piston pressure chamber
66 Latching element
68 Latching element bore
70 Conical face
72 Piston compression spring
74 Drain duct
76 Housing plug
78 Main valve guide sleeve
F1 Blocking position
F2 Releasing position
H1 Main valve open position
H2 Main valve closed position
L Longitudinal axis
P1 Pilot valve open position
P2 Pilot valve closed position R Radial direction
S1 Retraction position
S2 Deployment position
V Adjustment travel

What is claimed is:

1. A locking unit comprising:
a housing having a fluid inlet and a fluid outlet which are connectable to a coolant circuit, and a pilot pressure chamber;
a fluid duct which fluidically connects the fluid inlet to the pilot pressure chamber;
a solenoid;
a piston;
a pilot valve, wherein an armature and/or an armature rod of the solenoid adjusts the pilot valve between a pilot valve open position which releases the fluid duct and a pilot valve closed position which closes the fluid duct; and
a main valve, wherein a fluid pressure in the pilot pressure chamber adjusts the main valve between a main valve open position which releases the fluid outlet and a main valve closed position which closes the fluid outlet.

2. The locking unit according to claim 1, wherein the main valve comprises a pressure surface which delimits the pilot pressure chamber.

3. The locking unit according to claim 2, wherein the solenoid, the pressure surface, or both the solenoid and the pressure surface is sized in such a manner that a fluidic force which can act on the pressure surface is greater than an actuating force of the solenoid.

4. The locking unit according to claim 1, further comprising a main valve preloading element, wherein the preloading element preloads the main valve to the main valve open position.

5. The locking unit according to claim 1, wherein the pilot valve comprises a pilot valve slide part preloaded to the pilot valve closed position by a pilot valve preloading element.

6. The locking unit according to claim 1, further comprising a control element that is fixedly connected to the armature or the armature rod.

7. The locking unit according to claim 6, wherein the pilot valve comprises a pilot valve slide part that rests against the control element.

8. The locking unit according to claim 1, wherein the pilot valve comprises a pilot valve slide part on a circumference the armature or the armature rod, wherein the pilot valve slide part comprises a closure portion and a fluidic portion.

9. The locking unit according to claim 8, wherein the pilot valve slide part further comprises a sealing portion disposed on a side of the fluidic portion that is opposite another side of the fluidic portion where the closure portion lies.

10. The locking unit according to claim 1, further comprising a pilot valve chamber, wherein the solenoid comprises a yoke part which delimits the pilot valve chamber.

11. The locking unit according to claim 10, wherein the pilot valve chamber has at least one duct opening to the pilot valve chamber, wherein the fluid duct leads through the at least one duct opening.

12. The locking unit according to claim 11, wherein the pilot valve comprises a pilot valve slide part on a circumference the armature or the armature rod, wherein the pilot valve slide part comprises a closure portion and a fluidic portion.

13. The locking unit according to claim 12, wherein the pilot valve slide part further comprises a sealing portion disposed on a side of the fluidic portion that is opposite another side of the fluidic portion where the closure portion lies.

14. The locking unit according to claim 13, wherein the at least one duct opening is selectively closed or released by the closure portion.

15. The locking unit according to claim 1, wherein the housing is configured in one piece and in a materially integral manner.

16. The locking unit of claim 15, wherein the housing comprises two cavities and a housing partition wall, wherein the two cavities are separated by the housing partition wall, wherein the fluid duct leads through the housing partition wall.

17. The locking unit according to claim 1, further comprising a drain duct connected to the pilot pressure chamber.

18. The locking unit according to claim 1, which locks a movement of the piston impingeable with a pressure of fluid of the coolant circuit.

* * * * *